Figure 1:
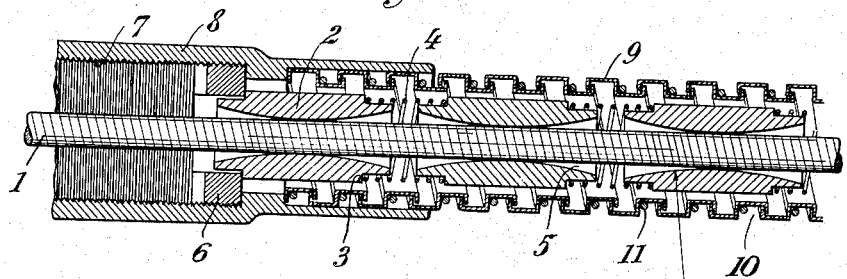

Sept. 4, 1956

J. BUCHSTEINER 2,761,297

FLEXIBLE SHAFT CONSTRUCTION

Filed Oct. 4, 1954

United States Patent Office 2,761,297
Patented Sept. 4, 1956

2,761,297

FLEXIBLE SHAFT CONSTRUCTION

Josef Buchsteiner, Burmoos, Salzburg, Austria, assignor to the firm Dentalwerke Glashütte Burmoos, Burmoos, Salzburg, Austria Application October 4, 1954, Serial No. 460,093

Claims priority, application Austria October 19, 1953

12 Claims. (Cl. 64—2)

Flexible shafts have been proposed in which the torque transmitting core is braced by spacing elements with respect to the protective sleeve, taking the form of a flexible metallic tube in order to reduce the scraping action of the core on the protective sleeve and the wear of the parts incident thereto to a minimum. In a known construction of a flexible shaft for transmitting high torques, on the cable transmitting the rotary motion the inner races of ball bearings are rigidly connected at larger distances the outer races of which bearings are braced against the flexible metal sleeve. In order to prevent the ball bearings from shifting on the flexible shaft, spiral springs are provided between the outer ball bearing races. In another proposal for bracing the flexible shaft (core) sleeve-shaped bearing members with a recess widening towards their ends are provided which bearing members are arranged at larger distances from one another between the protective sleeve and the core transmitting the torque. In order to prevent their axial displacement at both sides of the bearing members, sleeves are soldered on the core and between the mounting members and the sleeves loosely rotary discs are arranged. The friction developed between the discs and the bearing members causes heating of the shaft and possibly also rotation of the bearing members so that also between the bearing members and the protective sleeves a scraping action develops which causes additional heating of the flexible shaft. In this proposal the replacement of bearings members, moreover, is very difficult and owing to their large distances from one another at higher rotary speed swinging of the core between the mounting members is possible so that the core slides along the protective sleeve.

The invention relates to a flexible shaft with shell-shaped journal members arranged between the protective envelope and the torque transmitting core which members include a bore widening toward their ends for bracing the core and has for a purpose to remove the above mentioned drawbacks of the known shafts and to render same suitable for the transmission of very high rotary speed. Essentially the invention resides in the fact that the shellshaped journal members in closely spaced relation placed alongside each other are joined by compressive springs interposed therebetween to a resilient unit independent of the envelope and surrounding the core which unit in a straightened state of the shaft is braced only at the ends against the protective envelope receiving the pressures of the springs. A rotation of the journal members is in this manner avoided with advantage so that even with the flexible shaft being sharply bent and with contact between the bearing members and the protective envelope at spots, no scraping motions between the same and the bearing members can occur. The axial pressure of the springs in the shaft according to the application is balanced by tensile stress of the protective envelope and the same is stretched to a length measured with due consideration for optimum flexibility. In the embodiment of the invention the journal members have end portions of stepped formation which are constructed as seats for the spiral springs while in the grooves of the protective envelope taking the form of a metal hose a pretensioned tensile spring is placed. The journal members arranged at the ends of the shaft each bear against a threaded ring which is screwed into an inner thread of a terminal sleeve fastened on the protective envelope so that the axial pressure of the journal members can be compensated by the tension of the protective envelope. The journal members may be surrounded by an elastic sheath taking the shape of a hose whereby they are separated in sound deadening and vibration damping relation from the protective envelope and are protected against loss of lubricant. Because of the construction according to the invention, the flexible shaft can be used with highest speed and especially for dental machines and the finishing, grinding and polishing of chromium cobalt alloys in the dental steel techniques in which speeds of 25,000 R. P. M. are resorted to.

Figure 2:
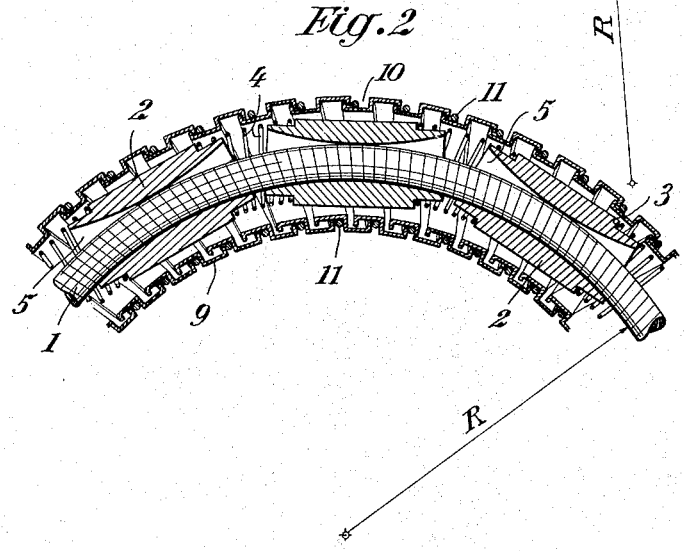
Figure 3:
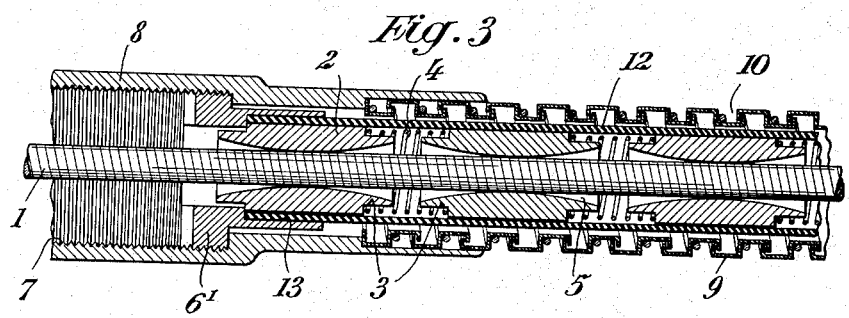

In the drawing the subject matter of the invention is illustrated in two examples of embodiment. Figs. 1 and 2 show one embodiment of a terminal piece of a flexible shaft in straightened shape or respectively an intermediate part of the shaft in bent shape in lengthwise sections. Fig. 3 shows a lengthwise section through a flexible shaft of a second form of execution.

The core 1 taking the form of a wire cable is journaled in shell-shaped journal members the ends 3 of which are exteriorly stepped to constitute seats for spiral springs 4 and the central bores 5 of which continuously widen toward the ends. If the generatrix of the bounding surface of the bore is constituted by a circular line, it determines at the same time, as apparent from Fig. 2, the shortest radius R of curvature of the flexible shaft. The journal members 2 are pivotally connected to one another by the springs 4 and closely spaced from one another, the journal members arranged at the end of the shaft engaging with their step 3 within the bore of a threaded ring 6 which coacts with the interior threads of a terminal sleeve 8 to which the end of the protective envelope 9 is connected. The same consists of a usual metal hose in the grooves 10 of which a tensile spring 11 in a pre-tensioned state is inserted so that the same balances the pressure of spiral springs 4. The other end piece of the flexible shaft is of like construction.

The torque transmitting core 1 carries the usual, not illustrated coupling elements. By the tension spring 11 of the protective envelope same is stressed like the journal members 2 so that rotation of the journal members is prevented without however lessening the flexibility of the shaft. The specific construction of the journal members 2 facilitates a centric guidance of the core with small bearing area and secures same against vibrations so that the shaft is adapted also for highest speeds.

In the form of execution illustrated in Fig. 3 a hose 12 is drawn over the journal members 2 which, with its end, engages in a stepped bore 13 of thread ring 6[1] which screens the journal members 2 in a sound and vibration damping manner from the protective envelope. The lubricant is preferably sealingly enclosed by the elastic sheath 12 so that filling of the lubricant after considerably longer periods suffices.

With a corresponding construction of the metal hose envelope under certain circumstances the arrangement of a tensile spring 11 in grooves 10 may be omitted, if the envelope itself is subjected to the pressures of springs 4 without thereby loosing its flexibility.

What I claim and desire to secure by Letters Patent is:

1. In a flexible shaft structure the combination comprising a torque transmitting core, a protective envelope surrounding the core, a plurality of shell-shaped journal members each having a bore widening toward the end and receiving the core and arranged within the envelope in spaced relation to one another and including two terminal journal members each connected to an end of the protective envelope, spiral compressive springs surrounding the core and within the envelope and each engaging with its ends adjacent journal members and thereby uniting the journal members to a resilient unit spaced from the envelope and surrounding the core.

2. In a flexible shaft structure the combination comprising a torque transmitting core, an exteriorly helically grooved protective envelope of metal surrounding the core, a plurality of shell-shaped journal members with stepped ends receiving the core and arranged within the envelope in spaced relation to one another, spiral compressive springs surrounding the core and within the envelope and each engaging with an end the stepped end portion of an adjacent journal member and thereby uniting the journal members to a resilient unit independent of the envelope and surrounding the core, and a pre-tensioned tensile spring encased in the envelope groove.

3. The combination according to claim 2 and also comprising a pair of interiorly threaded terminal sleeves each secured to one end of the protective envelope, a pair of exteriorly threaded rings each engaging the threads of a sleeve and engaged by a stepped end portion of one of the terminal journal members.

4. The combination according to claim 3 and also comprising an elastic hole shaped sheath surrounding the journal members.

5. In a flexible shaft structure the combination comprising a torque transmitting core, a protective envelope surrounding the core, a plurality of shell-shaped journal members receiving the core and arranged within the envelope in spaced relation to one another, spiral compressive springs surrounding the core and within the envelope and each engaging with its ends adjacent journal members and thereby uniting the journal members to a resilient unit spaced from the envelope and surrounding the core, and an elastic hose-shaped sheath surrounding the journal members.

6. The combination according to claim 5 and wherein the journal members have stepped end portions seating the spiral springs.

7. The combination according to claim 6 and wherein the envelope is a metal hose provided on its exterior surface with a helical groove, and also comprising a pre-tensioned pulling spring encased in the groove.

8. In a flexible shaft structure the combination comprising a torque transmitting core, a protective hose-shaped envelope of metal having in its exterior surface a helical groove, a plurality of shell-shaped journal members each having a bore widening toward the end and receiving the core and arranged within the envelope in spaced relation to one another, spiral pressure springs surrounding the core and within the envelope and each engaging with its ends the adjacent journal members and thereby uniting the journal members to a resilient unit spaced from the envelope and surrounding the core, and a pre-tensioned compressive spring encased in the envelope groove.

9. In a flexible shaft structure the combination comprising a torque transmitting core, a protective envelope surrounding the core, a plurality of shell-shaped journal members each having a bore widening toward the end and receiving the core and arranged within the envelope in spaced relation to one another and each having stepped ends, spiral compressive springs surrounding the core and within the envelope and each seated with its ends on the stepped ends of the journal members and thereby uniting the journal members to a resilient unit spaced from the envelope and surrounding the core.

10. In a flexible shaft structure the combination comprising a torque transmitting core, a protective metal hose envelope surrounding the core and having in its outer surface a helical groove, a pretensioned tensile spring encased in the groove, a plurality of shell-shaped journal members each having a bore widening toward the end and receiving the core and arranged within the envelope in spaced relation to one another, spiral compressive springs surrounding the core and within the envelope and each engaging with its end adjacent journal members and thereby uniting the journal members to a resilient unit spaced from the envelope and surrounding the core.

11. In a flexible shaft structure the combination comprising a torque transmitting core, a protective metal hose envelope surrounding the core and having in its outer surface a helical groove, a pretensioned tensile spring encased in the groove, a plurality of shell-shaped journal members each having a bore widening toward the end and receiving the core and arranged within the envelope in spaced relation to one another, spiral compressive springs surrounding the core and within the envelope and each engaging with its end adjacent journal members and thereby uniting the journal members to a resilient unit spaced from the envelope and surrounding the core, and a pair of exteriorly threaded rings, a pair of interiorly threaded sleeves each connected to an end of the protective envelope and threadedly receiving a ring, each of the terminal journal members engaging within one of the rings.

12. In a flexible shaft structure the combination comprising a torque transmitting core, a protective metal hose envelope surrounding the core and having in its outer surface a helical groove, a pretensioned tensile spring encased in the groove, a plurality of shell-shaped journal members each having a bore widening toward the end and receiving the core and arranged within the envelope in spaced relation to one another, spiral compressive springs surrounding the core and within the envelope and each engaging with its end adjacent journal members and thereby uniting the journal members to a resilient unit spaced from the envelope and surrounding the core, and a pair of exteriorly threaded rings, a pair of interiorly threaded sleeves each connected to an end of the protective envelope and threadedly receiving a ring, each of the terminal journal members engaging within one of the rings and an elastic hose-shaped sheath surrounding the journal members.

References Cited in the file of this patent

FOREIGN PATENTS 336,347      Great Britain _____ Oct. 16, 1930